(12) United States Patent  
Glucksman et al.

(10) Patent No.: US 6,622,618 B1  
(45) Date of Patent: Sep. 23, 2003

(54) SALAD SPINNER

(75) Inventors: Dov Z. Glucksman, Wenham, MA (US); Laura J. Nickerson, Andover, MA (US); Gary P. McGonagle, Lynn, MA (US)

(73) Assignee: Bojour, Inc., Pacheco, CA (US)

( * ) Notice: Subject to any disclaimer, the term of this patent is extended or adjusted under 35 U.S.C. 154(b) by 0 days.

(21) Appl. No.: 10/172,763

(22) Filed: Jun. 14, 2002

(51) Int. Cl.[7] .......................... A47J 37/10; A47J 43/04; F26B 17/24; F26B 17/30
(52) U.S. Cl. .................. 99/495; 34/58; 99/511; 210/360.1; 494/60; 494/84
(58) Field of Search .................. 99/495, 511–513, 99/516, 536, 479, 485; 34/8, 58, 184; 210/360.1, 380.1, 781, 784; 494/11, 37, 46, 60, 62, 63, 84; 241/282.1, 37.5, 92; 426/443, 478, 601; 366/234, 601

(56) References Cited

U.S. PATENT DOCUMENTS

| | | | |
|---|---|---|---|
| 4,090,310 A | 5/1978 | Koff | 34/58 |
| 4,702,162 A | 10/1987 | Sontheimer et al. | 99/495 |
| 5,562,025 A | 10/1996 | Bull et al. | 99/495 |
| 5,865,109 A | 2/1999 | Bull | 99/498 |
| 5,904,090 A | 5/1999 | Lillelund et al. | 99/495 |
| 5,992,309 A | 11/1999 | Mulhauser et al. | 99/495 |
| 6,018,883 A | 2/2000 | Mulhauser | 99/511 |
| 6,343,546 B2 * | 2/2002 | Ancona et al. | 99/495 |

* cited by examiner

Primary Examiner—Timothy F. Simone
(74) Attorney, Agent, or Firm—George A. Herbster

(57) ABSTRACT

A battery-operated two-speed salad spinner. The bowl receives one of two differently sized baskets. A cover includes a driving mechanism that rotates a selected bowl through a driving wheel.

19 Claims, 12 Drawing Sheets

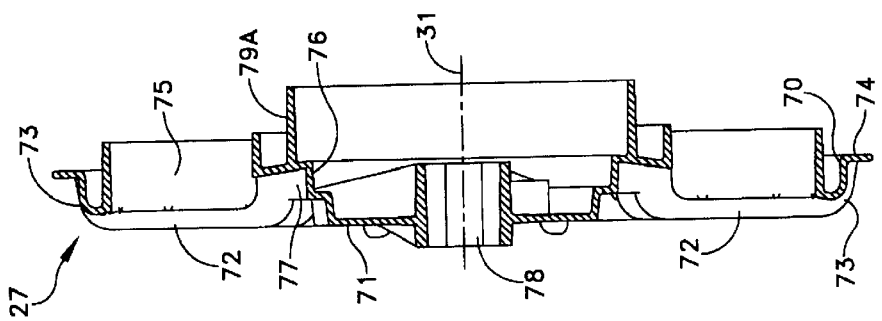
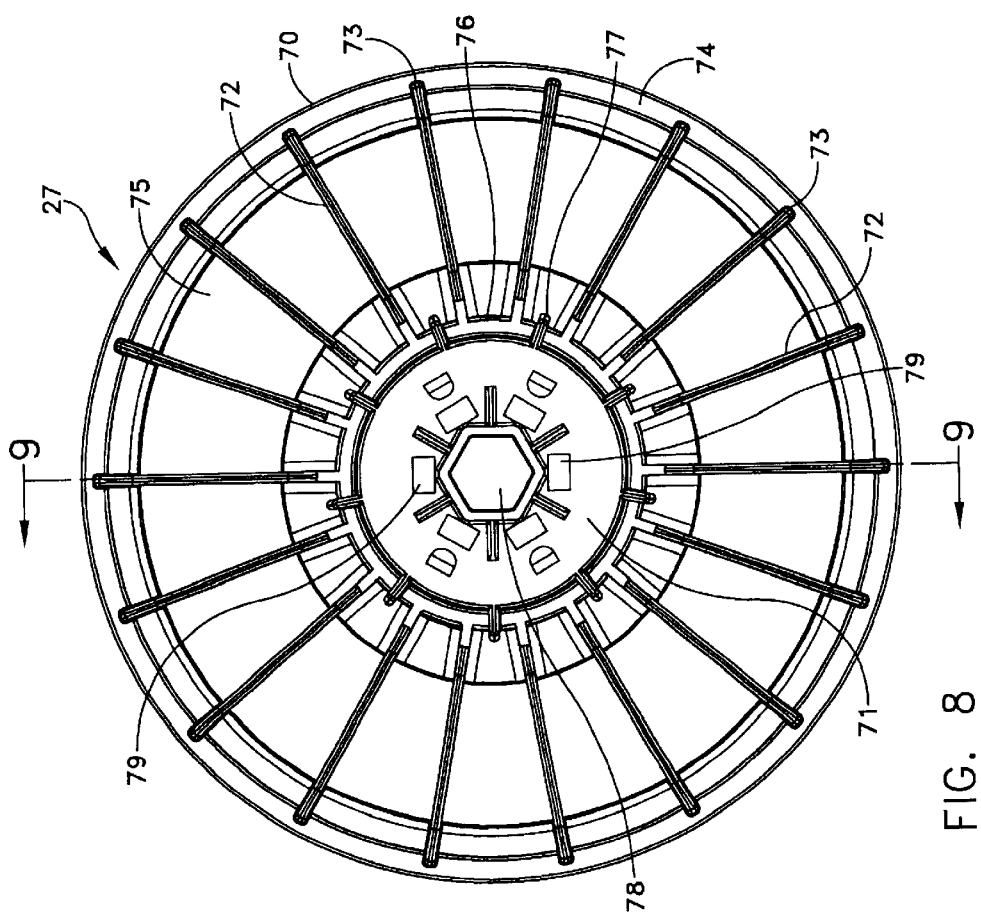
FIG. 9
FIG. 8

SALAD SPINNER

BACKGROUND OF THE INVENTION

1. Field of the Invention

This invention generally relates to appliances, such as salad spinners, useful in the preparation of certain foods and more specifically to an improved battery-operated salad spinner.

2. Description of Related Art

Salad spinners are appliances useful in food preparation, particularly in cleaning certain fruits and vegetables. Typically an individual washes such foods by immersion in a water bath or by directing a stream of water onto the food from a faucet. In many situations it is desirable to dry these washed foods. Salad spinners provide such a drying function by centrifuge action. That is, they spin the food in a basket about an axis with the result that water oh the food displaces to a surrounding bowl.

A number of prior art salad spinners are hand-operated. U.S. Pat. No. 5,865,109 (1999) to Bull, U.S. Pat. No. 5,904,090 (1999) to Lillelund et al., U.S. Pat. No. 5,992,309 (1999) to Mulhauser et al. and U.S. Pat. No. 6,018,883 (2000) to Mulhauser disclose such hand-operated salad spinners. Each has a mechanical actuator. In accordance with the Bull patent, a user moves a handle back and forth in a horizontal plane about a vertical axis that is offset from the center of the salad spinner. A user rotates a handle in a horizontal plane in the salad spinner that the Lillelund et al. patent discloses. In the salad spinners of the Mulhauser et al. and Mulhauser patents, a user pushes an actuator down along a central vertical axis toward a support to rotate a basket; a spring returns the actuator to an original upper position. In the Lillelund the actuator reciprocates along a vertical axis or rotates about an axis. It is a common operating characteristic of each of these systems that the user must continue to repeat these motions until a desired level of drying has been achieved.

Each of these salad spinners has several common characteristics. Each requires manual mechanical cranking or similar operations. Each requires a two-handed operation. That is, one hand must support the salad spinner in a fixed position on a counter or like support while the other hand produces the required mechanical motion. This requires a certain level of dexterity that may not be enjoyed by all persons. Spin speed is not constant. Operating efficiency depends on spin speed (i.e., the angular velocity provided by the salad spinner). As spin speeds drop, the time required to complete a spinning or drying operation increases. Therefore, it would be desirable to provide a salad spinner that overcomes these characteristics. That is, it would be desirable to provide a salad spinner that spins at a constant speed and that can be operated with a single hand.

U.S. Pat. No. 4,702,162 (1987) to Sontheimer et al. discloses a salad spinner constructed as an accessory for a conventional food processor. Such an approach does provide a powered drive that eliminates any manual operations and uneven spinning speeds. However, conventional food processors operate at speeds that are much to high to be applied directly to a salad spinning operation. Consequently, the salad spinner of this patent includes a speed reducing mechanism. This speed reducing mechanism is isolated from the food receptacle. The addition of an isolated speed reducing mechanism produces a complex accessory that is difficult and costly to manufacture.

U.S. Pat. No. 6,343,546 (2002) to Ancona et al. discloses another electric salad spinner embodiment. This salad spinner comprises a base component, a generally cylindrical basket component, a lid having a handle, and on/off switch and a drive motor. The cover may also have a liquid dispenser assembly. In this device, liquid accumulates in the bottom of the base component. To remove the liquid it is necessary to remove the lid and the basket component so the base component can be inverted to empty any accumulated liquid.

In many of the foregoing salad spinners, the basket has an open top and a stationary lid or cover for the base component or bowl provides the means for keeping food in the basket. U.S. Pat. No. 5,562,025 (1996) to Bull discloses a salad spinner with a bowl and a colander for rotation in the bowl. A mechanical drive mechanism in a lid rotates a fixed plate that engages the colander. This does provide a cover that is stationary with respect to the colander. However, the plate is closely spaced to the lid, so cleaning is difficult.

As will now be apparent, each of the foregoing salad spinners and related devices has certain drawbacks. Some are difficult to operate. Others are difficult to clean. Still others required extended times for completing a spinning operation. In addition, each discloses an apparatus with a single basket having a storage volume that corresponds to the storage volume of the bowl or base member. There are situations in which it would be preferable to provide a system that would accommodate differently sized baskets that could be more closely matched to the requirements of a particular spinning task. Moreover, the electrically driven salad spinners are more costly to manufacture than are the manually operated salad spinners.

SUMMARY

Therefore, it is an object of this invention to provide an electrically operated salad spinner that provides easy, one-handed use and that approximates the costs of a manually operated salad spinner.

Another object of this invention is to provide an electrically operated salad spinner that provides one-handed easy use and provides constant speed spinning operations.

Still another object of this invention is to provide a salad spinner that can be used during the washing or soaking of food.

Yet another object of this invention is to provide a salad spinner that accommodates differently sized baskets for improved flexibility and convenience and with minimal storage requirements.

Yet still another object of this invention is to provide a salad spinner that accommodates differently sized baskets and can operate different constant spinning speeds optimized for each basket.

Still yet another object of this invention is to provide a motor drive that is particularly adapted for use with salad spinners and other like devices.

In accordance with this invention a salad spinner comprises a bowl having an open top and a closed bottom with a central pivot and an open-top lattice basket with a bottom portion carrying a central bearing for engaging the central pivot upon insertion in the bowl. A removable cover spans the open top of the bowl and includes an electric drive with a centrally disposed drive shaft emerging from the cover toward the bowl. A drive wheel has a central hub engaging the drive shaft and a driving surface for engaging the basket in a positive driving relationship whereby energizing the electric drive causes the drive wheel to spin the basket relative to the bowl.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIG. 8 is a top view of one embodiment of a drive wheel useful in accordance with this invention;

FIG. 9 is a cross-section view taken along lines 9—9 in FIG. 8;

DESCRIPTION OF ILLUSTRATIVE EMBODIMENTS

Figure 1:
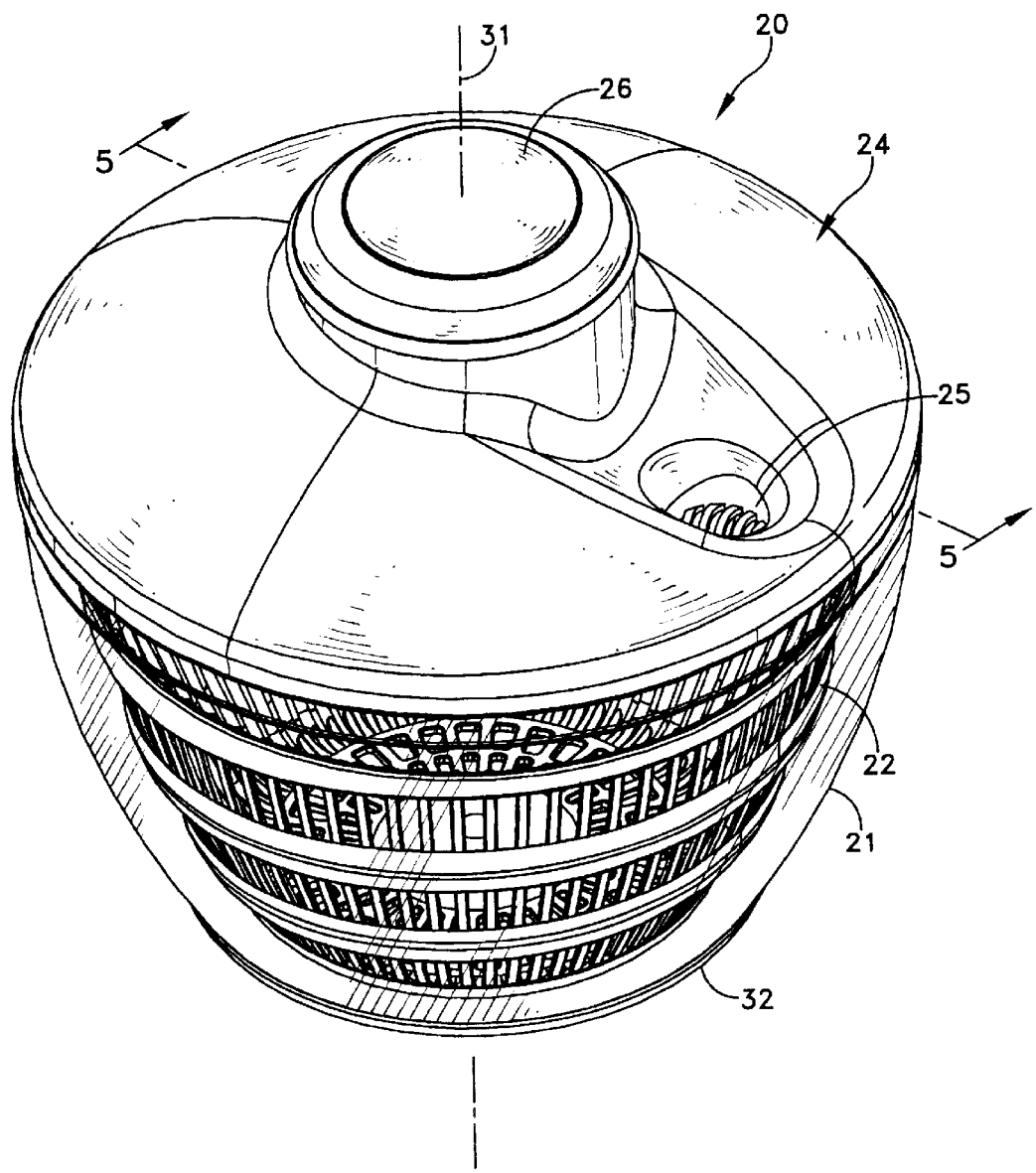
FIG. 1 is a perspective view of one embodiment of a salad spinner constructed in accordance with this invention.
Figure 2:
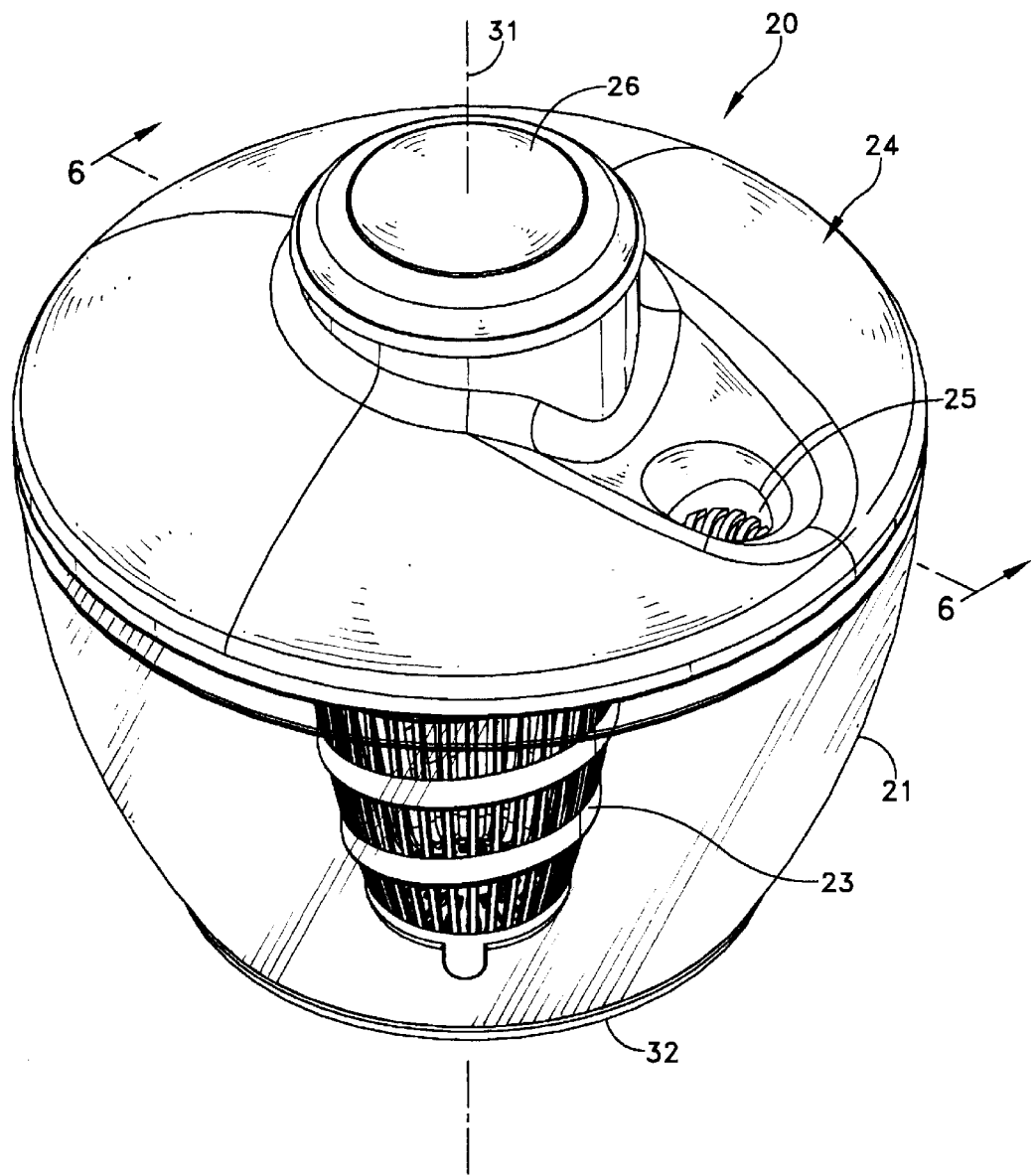
FIG. 2 is a perspective view of a second embodiment of the salad spinner shown in FIG. 1.

FIGS. 1 through 4 are perspective views of a salad spinner 20 constructed in accordance with this invention. The salad spinner 20 includes a translucent bowl 21 that receives a large basket or colander 22 as shown in FIG. 1. The large basket has a capacity that approximates the total volume of the bowl 21. A small basket or colander 23 as shown in FIG. 2 has a reduced basket diameter and a reduced capacity.

The salad spinner 20 includes a cover 24 with a water funnel 25 to allow water to be admitted into the bowl 21 with the cover 24 in place. As described later, admitting water into the bowl provides a soaking function without the requirement of any additional utensils. An actuator 26 at the top center of the cover 24 coacts with a battery-operated drive to spin a basket. As described later, the actuator 26 allows a user to select one of two positions and corresponding spinning speeds to operate the salad spinner 20 with one hand.

Figure 3:
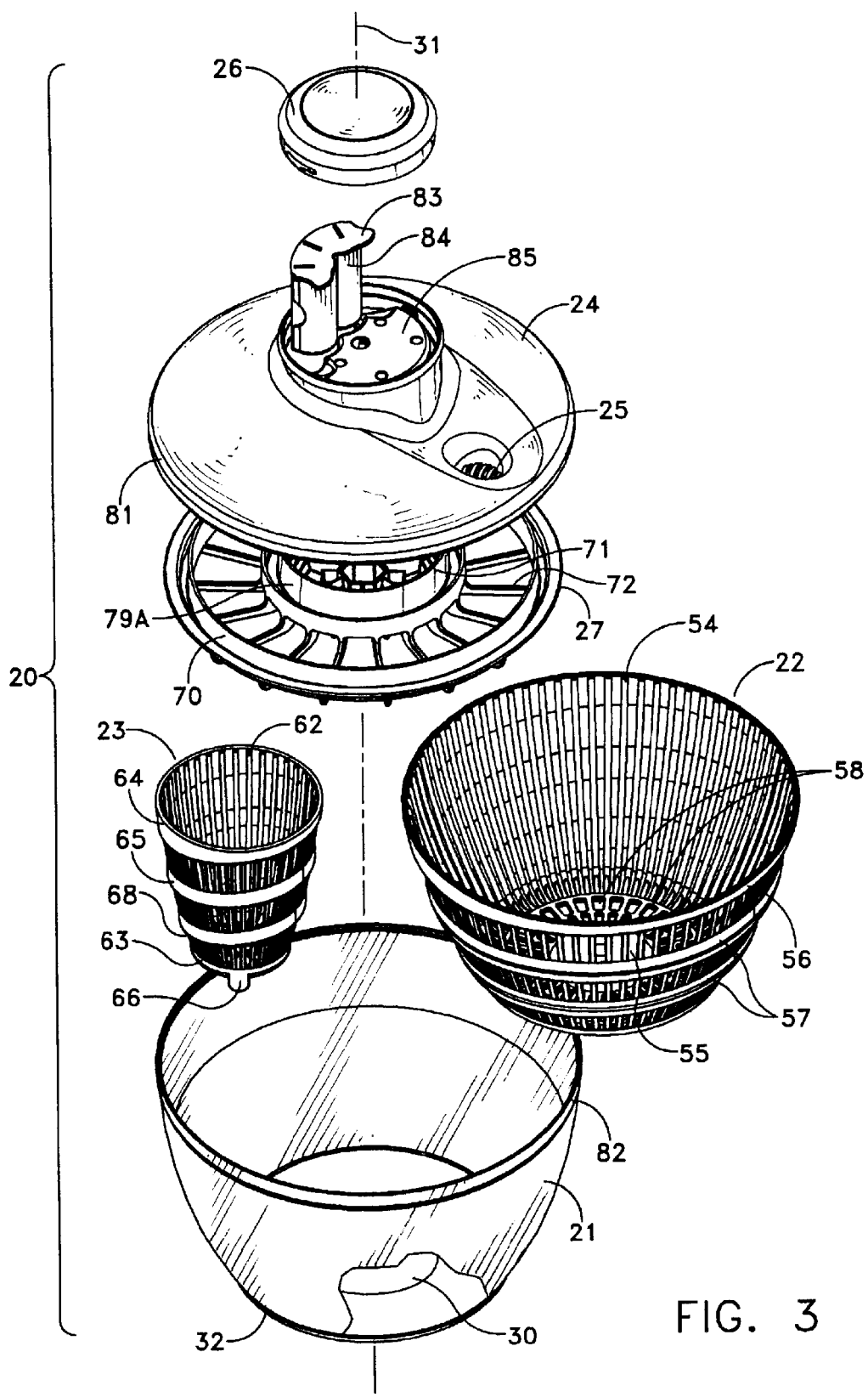
FIG. 3 is an exploded view of a salad spinner constructed in accordance with this invention.

As shown specifically in FIG. 3, the salad spinner 20 includes a driving wheel 27 that acts as a coupling between a drive mechanism in the cover 24 and the selected one of the baskets 22 and 23 to be used. As also shown in FIG. 3, the bottom of the bowl 21 contains a drain assembly 30 that allows water to accumulate in the bowl 21 or allows water to drain from the bowl 21.

In use, an individual selects a large basket 22 or small basket 23 and fills the selected basket with food. If it is desired to soak the food, the drain 30 is closed, the basket and food inserted into the bowl 21, the driving wheel 27 and cover inserted and water admitted through the funnel 25 until the appropriate level has been reached as observed through the transparent sides of the bowl 21. If an individual elects to rinse the food and place it in the basket without soaking, the drain assembly 30 is opened. After removing any wash water or upon completion of the rinsing operation, an individual depresses the actuator 26 to energize the motor drive and spin the basket, at one of two possible speeds in a preferred embodiment. As the actuator 26 lies on a vertical axis 31 through the center of mass of the bowl, vertical pressure on the actuator 26 does not produce any significant tipping moment for the salad spinner 20.

Figure 4:
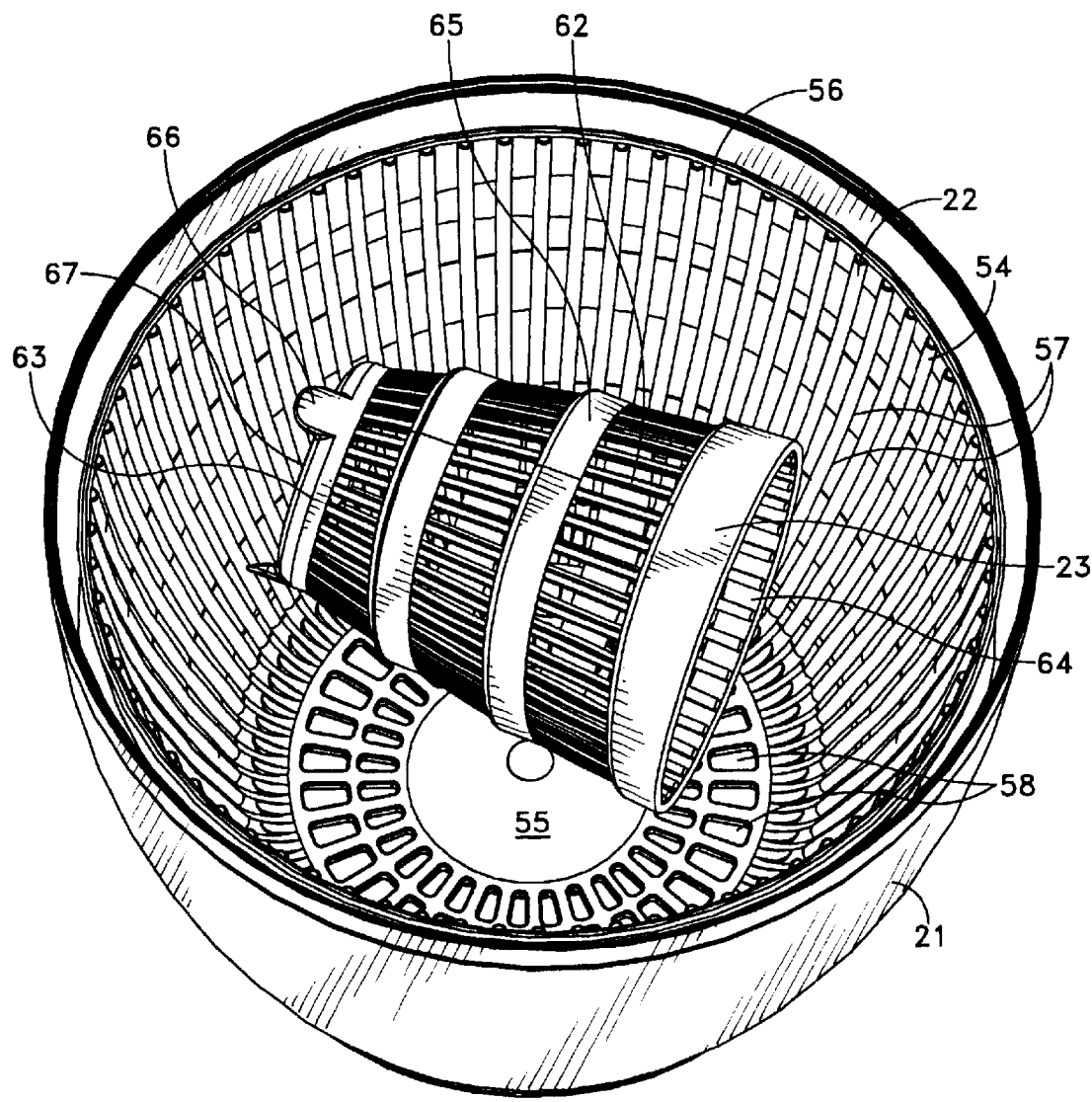
FIG. 4 is a perspective view of a portion of the salad spinner that demonstrates certain storage capabilities.

FIG. 4 depicts another advantage of this invention. The salad spinner 20 provides the capability of using differently sized baskets with no requirement for additional storage space. The large basket 22 fits into the bowl 21 in a normal manner. However, there is still sufficient volume for the small basket 23 to lie within the confines of the large basket 22 and permit the driving wheel 27 and cover 24 to mount normally on the bowl 21. Thus, all the elements are stored within the same outline of the operating salad spinner 20 as when the salad spinner 20 is in use.

Figure 5:
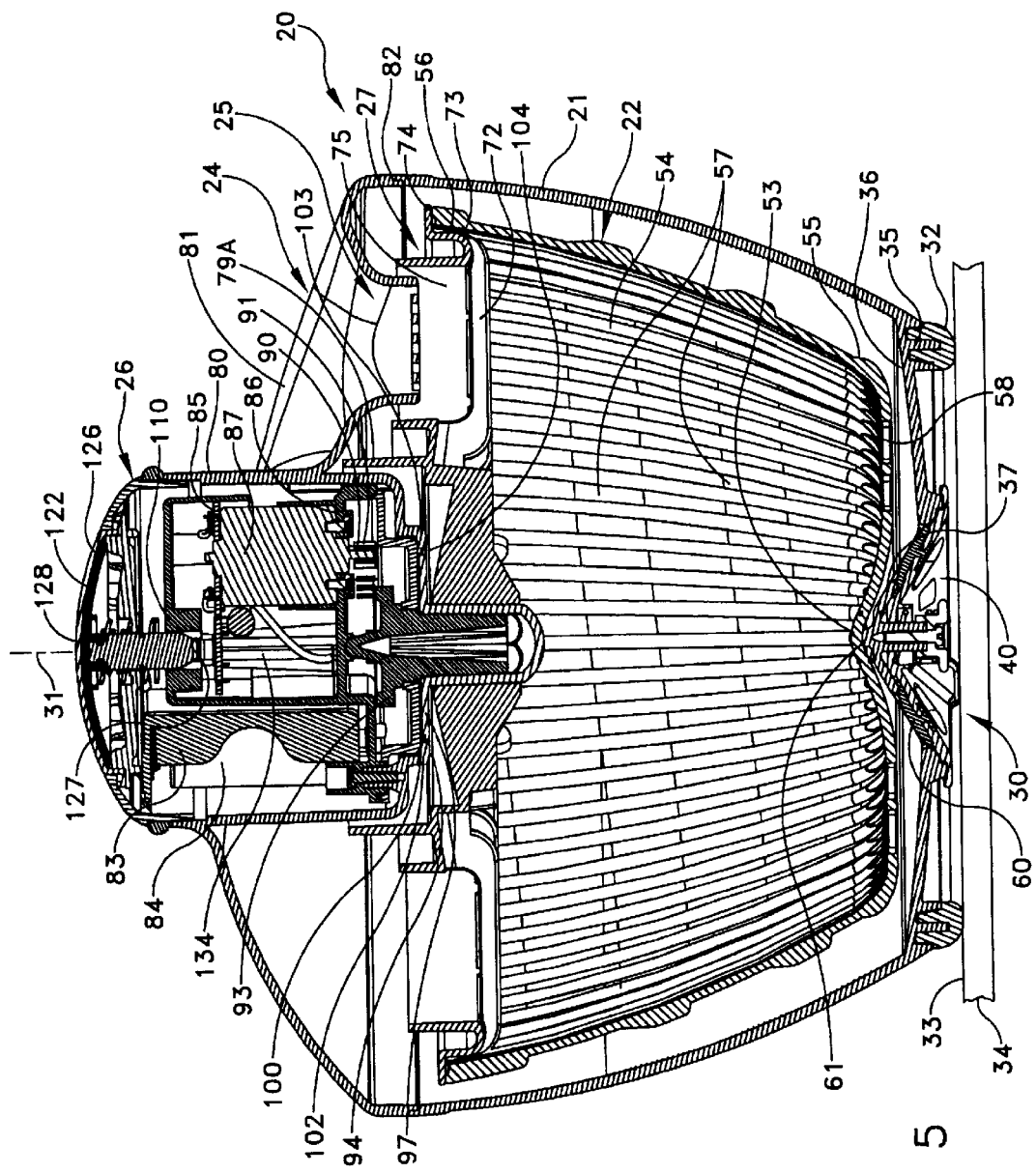
FIG. 5 is a cross-section along lines 5—5 in FIG. 1.
Figure 6:
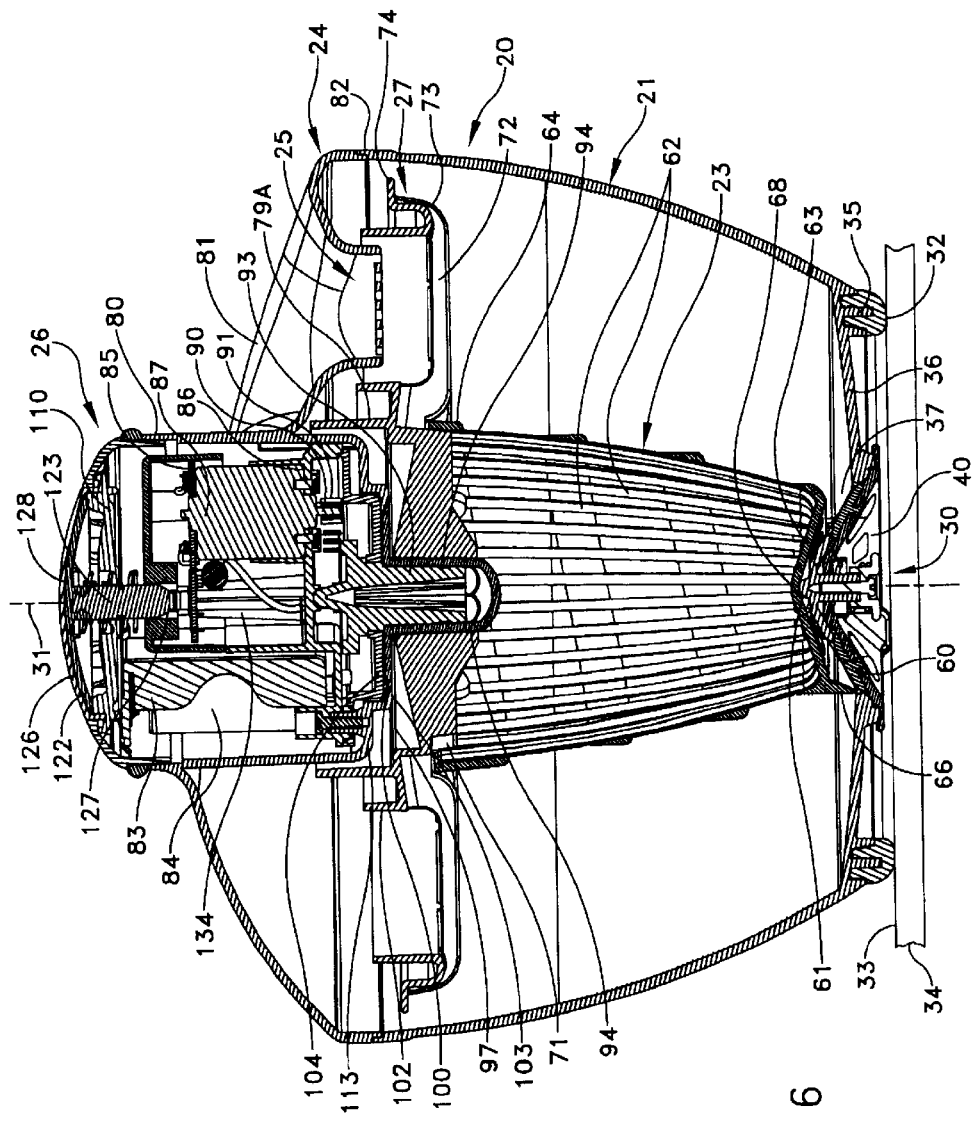
FIG. 6 is a cross-section along lines 6—6 in FIG. 2.

Referring particularly to FIGS. 3, 5 and 6, a non-skid ring 32 about the periphery of the bowl 21 constitutes a nonskid base that rests on a support plane, as the surface 33 of a counter 34 shown in FIGS. 5 and 6. More specifically, the bowl 21 has a plurality of axially extending locking projections 35 about the periphery of a bottom closure 36 of the bowl. The ring 32 comprises a non-skid material with corresponding channels that engage the locking projections 35 as known in the art. Therefore the bowl 21 has a surface that defines non-skid support plane that is perpendicular to the axis 31 and allows the salad spinner 20 to operate with the use of only a single hand. This is achieved because pressure on the actuator 26 is directed along the axis 31 and because the non-skid ring 32 resists any sliding motion across a supporting surface.

Figure 7:
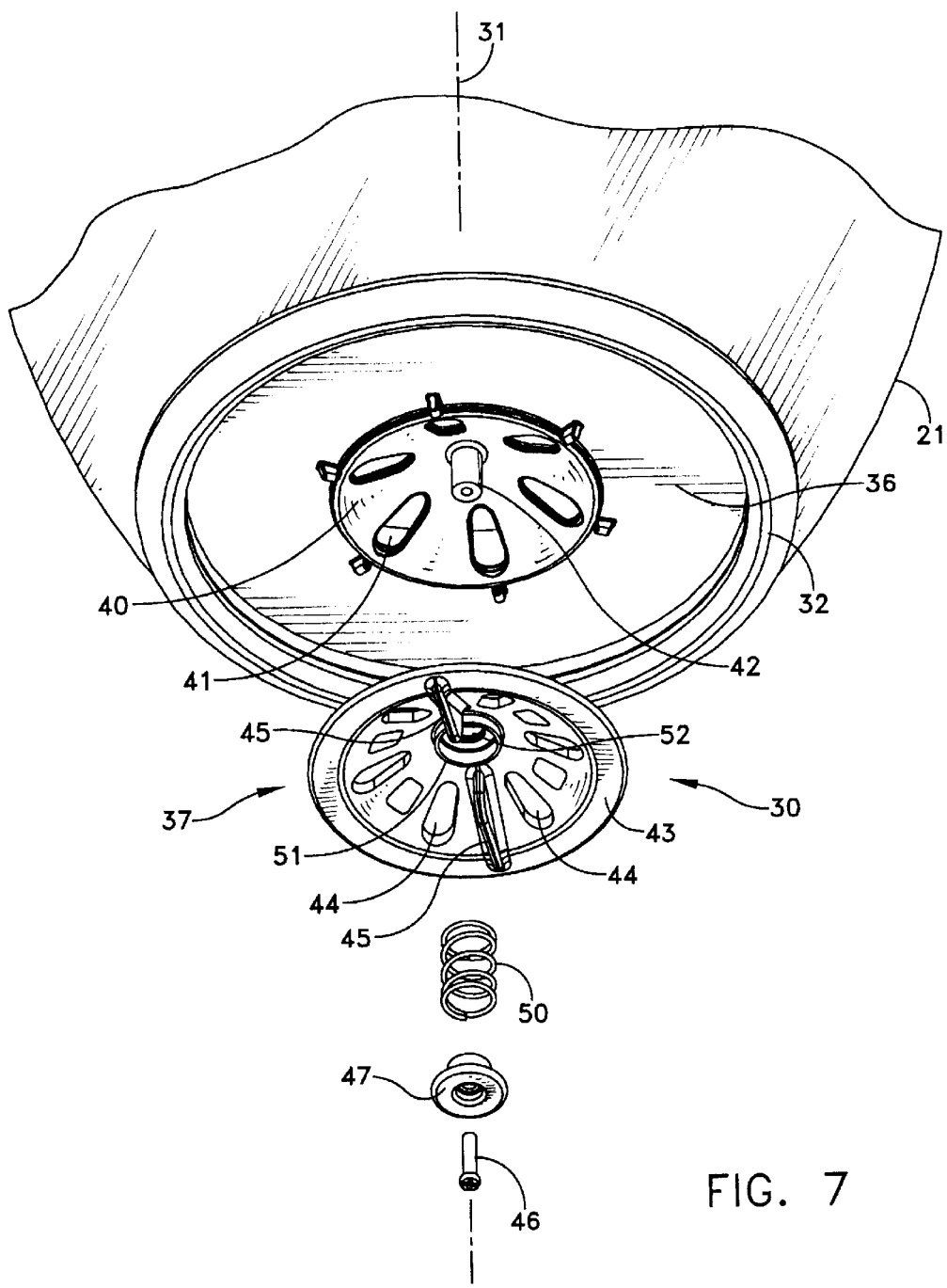
FIG. 7 is an exploded perspective view of a portion of a salad spinner to illustrate one embodiment of a drain assembly.

Referring to FIGS. 5 through 7, the bottom closure 36 of the bowl 21 slopes downwardly to a center structure 37 that includes the drain assembly 30. The centrally located drain assembly 30 includes a drain plate 40 that has a plurality of angularly, spaced elongated slots 41 and a central support 42, The drain plate 40 is concave when viewed from the bottom as shown in FIG. 7.

Still referring to FIG. 7, a conically-shaped valve plate 43 also contains angularly spaced elongated slots 44 and is adapted to interfit with the drain plate 40. The angular spacing between the adjacent slots 44 is greater than the width of the slots 41. Thus the valve plate 43 can moved into a sealing relationship that blocks water from passing through the angular slots 41 or to a drain position in which the angular slots 44 align with the angular slots 41, and water drains from the bowl 21.

Two radially extending finger grips 45 facilitate manipulation of the valve plate 43. In this embodiment two diametrically opposed finger grips 45 are shown to facilitate rotation; other configurations are possible. The valve plate 43 rotates about the axis 31 on a structure that includes a screw 46 that passes through a bushing 47 to engage one end of a spring 50. The other end of the spring 50 circumscribes a central aperture 51 through the valve plate 43. A collar 52 and a portion of the valve plate 43 around the central aperture 51 define a seat for the spring 50. The central support 42 receives the screw 46. Consequently the spring 50 urges the valve plate 43 into close relationship with the drain plate 41.

This structure constitutes a drain assembly 30 in the bottom of the bowl 21. The drain assembly 30 allows the discharge any of water collected in the bowl when the angular slots 44 align with the angular slots 41. More specifically, the drain assembly 30 includes a drain plate 43 at the bottom of the bowl 21 that has open and closed positions to control the discharge of water from the bowl 21 through the drain plate 40.

When the cover 24 includes a structure such as the funnel 25, the funnel constitutes a passage that allows water to be added to the bowl 21. Thus in use, an individual can move the valve plate 43 to a closed position and add water to the bowl for soaking. When the soaking operation is complete, the individual can move the valve plate 43 to an open position whereupon essentially all the water drains from the bowl 21. During subsequent spinning operations any water will be spun from the food and collected at the bottom of the bowl 21 to drain if the valve plate 43 is in the open position and water accumulates above the level of the angular slots 41.

Now referring to the basket structure and FIGS. 3 through 5, the large basket 22 is an open lattice structure that includes a plurality of angularly spaced, longitudinal ribs 54 that extend from a base 55 to an upper lip 56. The upper lip 56 circumscribes the ribs 54 thereby to form inwardly projecting radial projections 57. The basket 22 additionally includes latitudinally spaced circumferential ribs 57. The base 55 has a centered concave structure that is a basket bearing 53. As shown, the basket 22 is formed as a colander having a shape that conforms with the bowl 21. Water discharges through the opening in the lattice during a spinning operation for collection in and drainage from the bottom of the bowl 21. Any water that collects in the basket 22 drains through drain holes 58 in the bottom of the basket 22.

Still referring to FIGS. 5 and 6, the drain plate 40 carries an interfitted conical plate 60. It includes an upstanding tip that acts as a bowl pivot 61. When the large basket 22 is inserted in the bowl, the pivot 61 engages the basket bearing 53 to support the basket 22 within the bowl 21. Although the basket 22 tends to tilt from an upstanding position without the cover 24 in place, the upper lip 56 engages the sides of the bowl 21 to limit any tilt off the axis 31.

Referring now to FIGS. 2 through 4 and 6, the small basket 23 is useful in situations where the centrifuge forces on food in the large basket 22 might cause damage or for other reasons. The small basket 23 has an open lattice structure with longitudinally extending vertical ribs 62 extending between a base 63 and an upper lip 64 that circumscribes the ends of the longitudinal ribs 62. Although the latitudinal ribs 65 are circumferentially equally spaced ribs without any wave motions, such a modification is possible. The small basket 23 constitutes a small colander. A base 63 has a basket bearing 68 that also interfits with the bowl pivot 61 on the bottom of the bowl 21. The base 63 additionally includes radially extending, angularly spaced drain holes 67 like the drain holes 58 in FIG. 5 in the large basket 22 of FIG. 4 to facilitate drainage.

When a small basket 23 is inserted, the basket bearing 68 engages the bowl pivot 61. However, the diameter of the small basket is, as can be seen by comparing particularly FIGS. 5 and 6, significantly less. Consequently it is not stable in the bowl and could tilt from the axis 31 to a significant degree. To overcome this instability, the small basket 23 additionally includes a set of equiangularly spaced feet 66 that depend from the base 63. Three such feet 66 are shown, but additional feet could be used. When one of the spaced feet 66 engages the base 63 of the bowl 21, further tilt is stopped. The length of each of the feet 66 is selected to assure that the small basket 23 will come into alignment with the driving wheel 27 as will become apparent.

Now referring to FIGS. 3, 8 and 9, the driving wheel 27 includes an outer cylindrical side wall 70, an inner circular base 71 and radial spokes 72. In one embodiment the driving wheel 27 includes eighteen such radial spokes equiangularly spaced at 20°. With respect to FIGS. 8 and 9, each spoke 72 extends radially beyond the side wall 70 to form an external rib extension 73. The outer radial side wall or shoulder 74 enables the driving wheel 27 to engage the upper lip 64 in a large basket. The rib extensions 73 align in the spaces between the longitudinal ribs 54 at the upper lip 56 of the large basket to produce a positive drive connection.

Each of the ribs 72 has a radially extending intermediate recess. Collectively the recesses define an annular trough or channel 75 that aligns radially with the funnel 25. This channel 75 allows some nesting of the drive wheel 27 and the cover 24 to reduce the overall height of and improve the width-to-height ratio of the salad spinner 20. Increasing this width-to-height improves the inherent stability of the spinner as known.

The inner circular base 71 defines an outer circumferential surface 76 with extensions 77 from a plurality of equiangularly spaced ribs 77. FIG. 8 depicts nine such ribs. The rib extensions 77 extend radially from the outer circumferential surface 76 by an amount corresponding to the depth of the vertical ribs 62 in the small basket 23. When the driving wheel 27 mates with the small basket 23, the rib extensions 77 lie between the internal rib extensions adjacent the upper lip 64 thereby to provide a positive driving connection. Thus the driving wheel 27 has a first driving surface for engaging one basket in a positive driving relationship. It also has a second driving surface for engaging a second basket of a different size.

In addition, the driving wheel 27 has a central collar 79A that is coaxial with the axis 31. As specifically shown in FIGS. 3, 5 and 6, this collar 79A is axially coextensive with the housing 80 and circumscribes the housing 80. The relationship of the collar 79A and housing 80 provide a barrier against any water entering between these two elements. This further assures that the components within the housing 80 do not become wet.

As described more fully hereinafter, the driving wheel 27 additionally engages the driving means that depends from the cover 24. More specifically and referring to FIGS. 3, 5 and 6, a cylindrical housing 80 that is centered with respect to the axis 31 extends above and below the remainder of the cover 24 shown as a cover portion 81. The cover portion 81 spans the open top of the bowl 21 and engages an upper lip 82 of the bowl 21.

The cylindrical housing 80 receives and supports a battery holder 83 with two or more batteries 84. It also supports spaced parallel upper and lower brackets 85 and 86. The upper and lower brackets 85 and 86 in turn support a dc motor 87 with an output drive shaft 90 that engages a drive pinion 91. A gear reduction unit 92 turns an output shaft 93 at a reduced speed. In one specific embodiment, a gear reduction system that provides a 25:1 gear reduction produces a 400 rpm output at the output shaft 93 when the dc motor turns at 10,000 rpm. Other ratios may be substituted.

Figure 10:
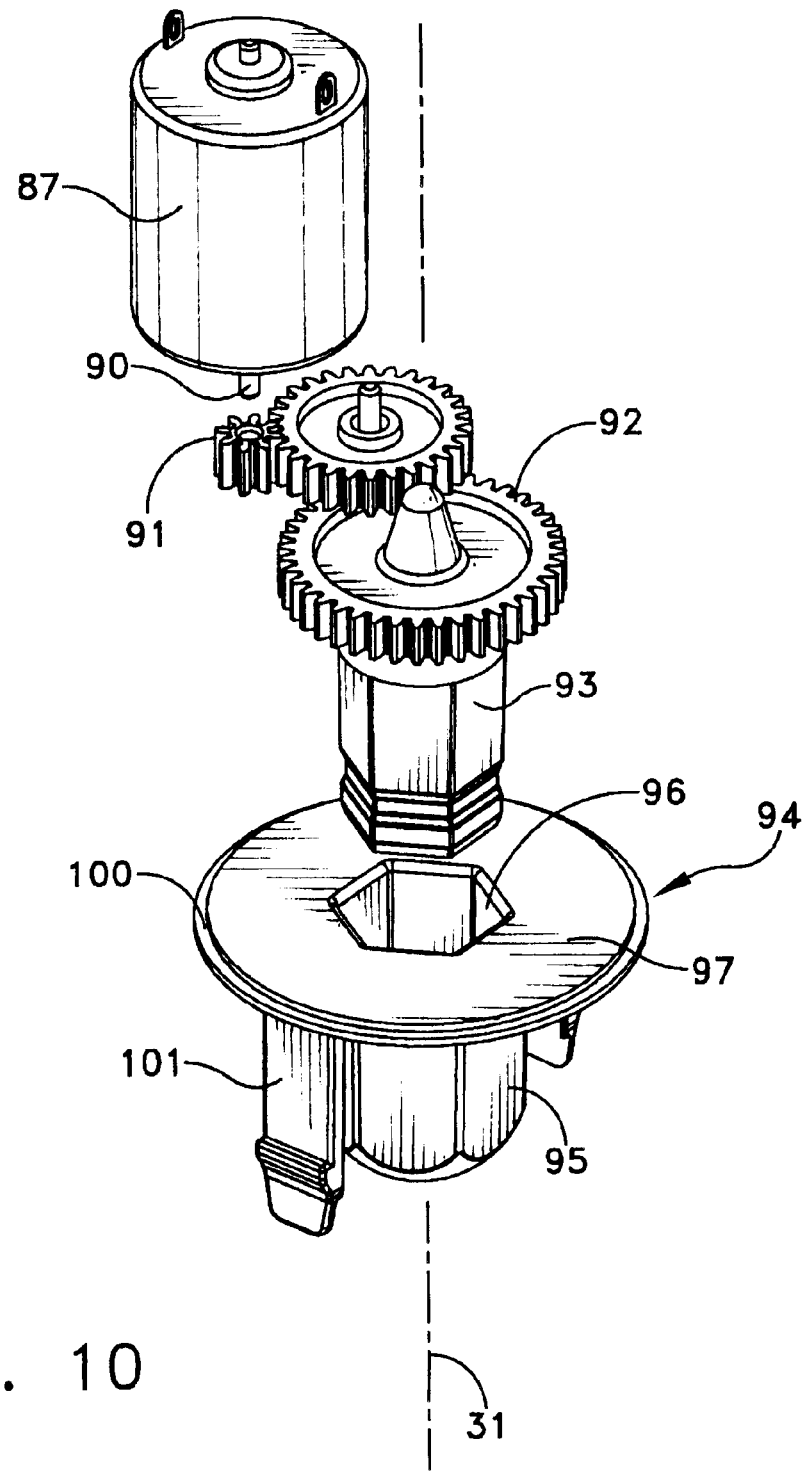
FIG. 10 is schematic representation of the electric motor drive elements useful in understanding this invention.

Still referring to FIG. 10, the output shaft 93 engages a coupling 94 that includes an axial extension 95 that, in this particular embodiment, has a hexagonal cross-section. The coupling 94 additionally includes a circumferential shoulder 100 and axially extending clips 101. Referring specifically to FIGS. 5 and 6, the cylindrical housing 80 has a lower transverse base 102 that forms a shoulder 103 and defines a circular passage 104. The shoulder 103 complements the shoulder 100. Consequently, the shoulders 100 and 103 form a rotary seal that minimizes any possibility of water migrating into the housing 80.

The axial hexagonal extension 95 engages with an hexagonal passage 78. During assembly, clips 101 engage one of several diametrically opposed pairs of the clip slots 79 in the drive wheel 27 thereby to form the coupling 94 and drive wheel 27 into a single unit. Thus, in accordance with this invention when the dc motor 87 is energized, the output shaft 93, coupling 94 and engaged driving wheel 27 rotate at a reduced speed with rotation of the driving wheel 27 producing corresponding rotation of either the large basket 22 or small basket 23 that is in place in the bowl 21.

Figure 11:
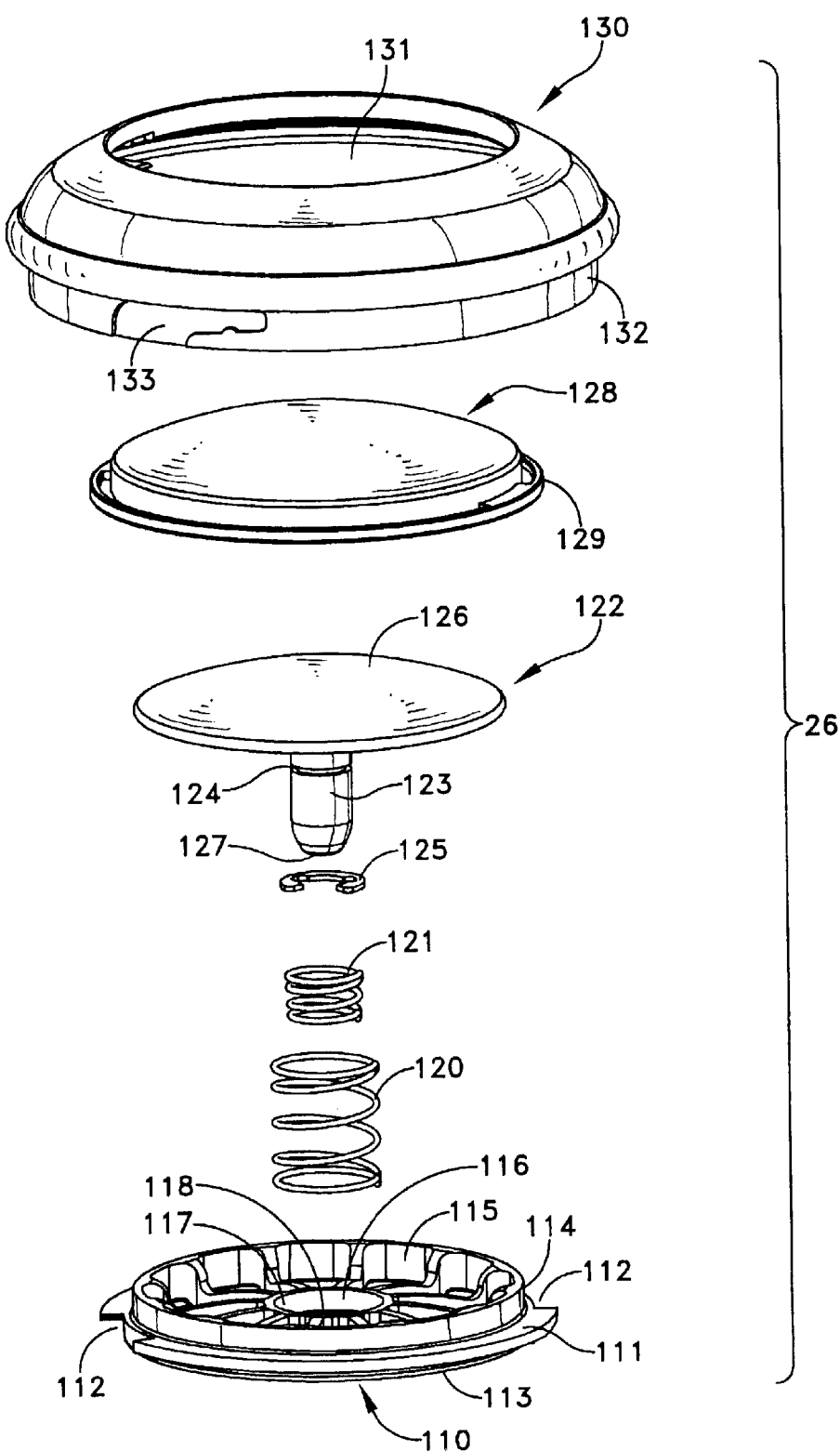
FIG. 11 is an exploded view of an actuator useful in accordance with this invention.

As previously indicated, the actuator 26 controls the energization of the dc motor 87. In the preferred embodiment of this invention, the actuator 26 is capable of establishing two different motor speeds. More specifically, the actuator 26 as shown in FIG. 11 includes a transverse spider 110 as particularly shown in FIGS. 5, 6 and 11. The spider 110 has a radially, extending circumferential rib 111 with diametrically opposed notches 112. In addition, it includes a downward extension or cylindrical body 113 and an upward extension or cylindrical body 114. A radially ribbed base 115 provides an axially stiff function for reasons that will become apparent later. A central passage 116 through the base 115 is bounded by a wall 117 and a shoulder 118 that acts as a spring seat.

The actuator 26 additionally includes a large spring 120 and a small spring 121. The small spring 121 is shorter than and has a smaller diameter than the large spring 121. One end (the bottom end in FIG. 11) of each of the springs 120 and 121 rests on the spring seat 118.

Still referring to FIG. 11, an actuator element 122 includes a shaft 123 that passes through the central passage 116 at the shoulder 118. The shaft 123 includes a circumferential groove 124 for receiving a C-clip 125. The C-clip 125 acts as an end stop for the upper ends of the springs 120 and 121. The actuator element 122 additionally includes a integral dome-shaped transverse disk portion 126 that transfers any axially directed force applied by the user to the shaft 123 and particularly to a lower end surface 127. A flexible cover 128 overlies the disk portion 126 and includes a circumferential end structure or surround 129 that engages the bottom portion of a bezel 130 particularly about a central opening 131 and a shoulder 132. Thus, the flexible cover 128 provides a seal with the bezel 130 to minimize the possibility of water from entering the actuator 26 and then through the opening 131 into the housing 80. An L-shaped locking groove 133 interacts with the corresponding structure on the interior of the housing 80 to provide a rotatable, releasable locking structure for affixing the actuator 26 to the cover 24.

When assembled, the spider 110 and bezel 131 define a cavity and may use a clamping structure in alignment with the notches 112 for maintaining the components in an assembled state again as known in the art. In a normal configuration, the cover bezel 130 limits the upward motion of the disk 126. In the uppermost position of the disk 126, the spring 120 bears against the surface 127 under some compression while the spring 121 will be under no compression due to its shorter length.

When a person begins to depress the actuator element 122 by applying a downward pressure to the disk 126, initially only the spring 120 produces a resisting pressure. When the clip 125 subsequently engages the inner spring 121 after additional downward movement, a marked pressure increase results to signal a second area of motion. When one or both the springs 120 and 121 fully compress, they constitute a downward end stop. These differences provide an actuator action with definite positions. As will new be shown, this structure provides an element that is displaceable along the axis 31 from an upper or "off" position to first and second "on" positions. As will now be apparent, the radially ribbed base 115 provides a strong support plane for the springs 120 and 121. The base 115 does not flex axially under loads. So the tactile feel during motion of the actuator disk 126 is repeatable and predictable.

Figure 12:
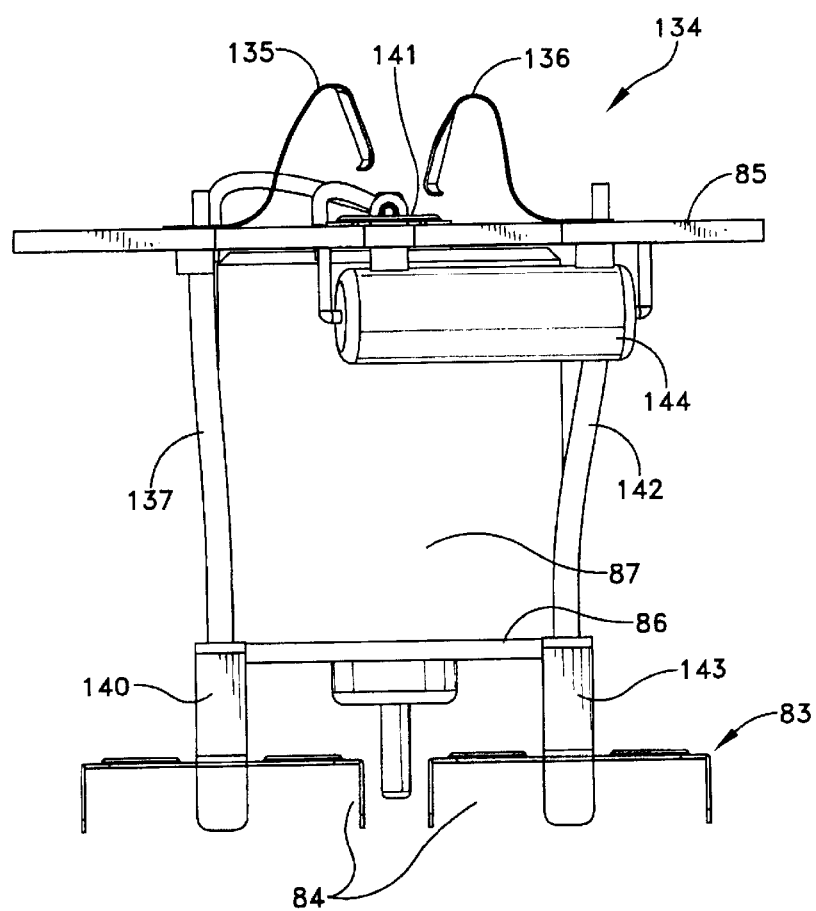
FIG. 12 is a view of the mechanical structure for a switch assembly useful in accordance with this invention.

The bottom surface 127 of the actuator element 123 shown in FIG. 11 interacts with a switch assembly 134 shown in FIGS. 5, 6 and 12 through 13C. Referring to FIG. 12, the upper and lower supports 85 and 86 support the switch assembly 134 adjacent the dc motor 87. The upper support plate 85 carries first and second contacts 135 and 136, These contacts have an inverted-vee configuration with the apex of the contact 135 at a higher elevation above the upper support 85 than the apex of the second contact 136.

A conductor 137 interconnects a positive terminal 140 from the battery holder 84 to a third contact 141. A second conductor 142 couples a negative battery terminal 143 to one input of the dc motor 87. The contact 135 connects to a resistor 144 tied to a second terminal of the dc motor 87. The switch contact 136 connects directly to that same second dc motor connection.

Figure 13C:
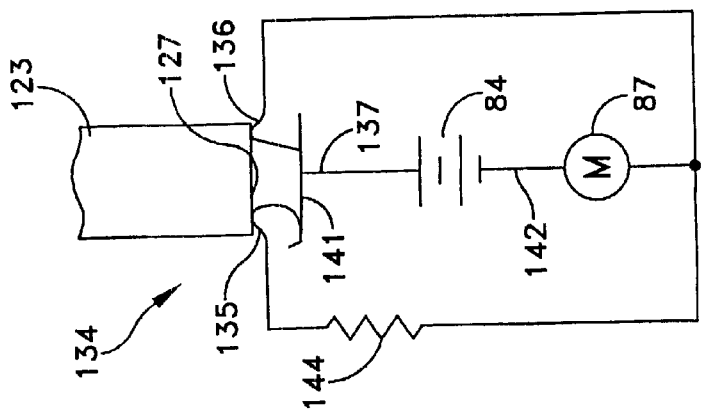
FIGS. 13A through 13C are schematic views that depict the operation of the switch assembly in FIG. 12.
Figure 13B:
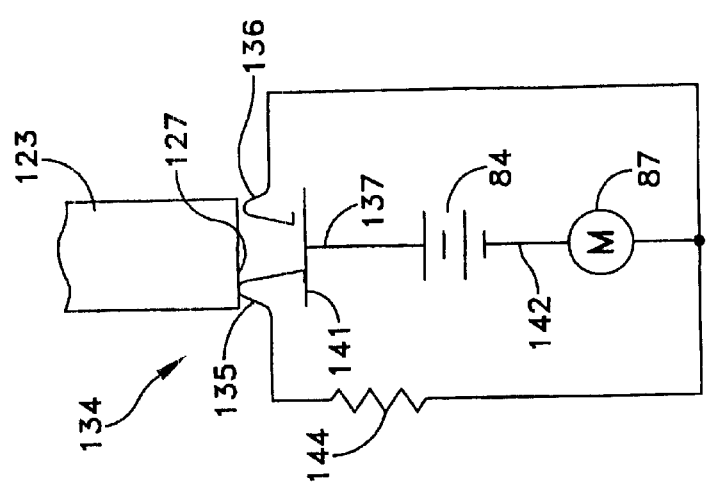
Figure 13A:
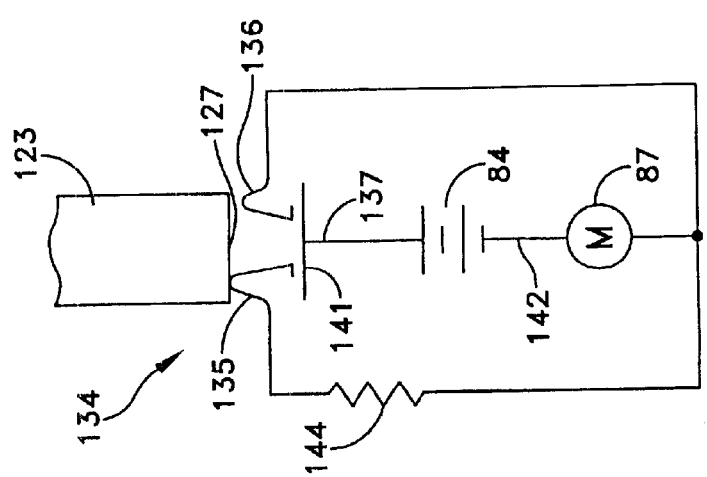

Now referring to FIGS. 13A through 13C, FIG. 13A depicts the elements in which the actuator element shaft 123 is at its uppermost position. The surface 127 is spaced from the contacts 135 and 136. Consequently there is no contact with the third contact 141, so the dc motor 87 is deenergized.

As the actuator element shaft 123 is depressed through the distance in which only the spring 120 is being compressed, the surface 127 eventually drives the contact 135 into the contact 141. In this position the contact 136 remains spaced from the contact 141. Consequently, the battery 84 energizes the motor 87 through the resistor 144. The resistor 144 provides a voltage drop so that the motor 87 operates at a speed that is less than the maximum operating speed. The specific value of the resistor 144 determines the motor speed and determining a specific value is a straightforward procedure.

When the actuator element shaft 123 is displaced further and compresses both the springs 120 and 121, the surface 127 drives both contacts 135 and 136 into the contact 141. The direct connection between the contact 136 and the dc motor 87 is electrically in parallel with the resistor 144. Consequently the dc motor 87 is energized with the full voltage of the battery 84 and operates at a higher maximum speed based upon the voltage from the battery 84. Thus the switch assembly 184 selectively conveys electric power to the electric motor that in a preferred embodiment is a dc motor and in which the source of electric power is a battery power supply mounted in the cover 24. Moreover, the switch assembly 134 is characterized by an "off" position when the springs bias the actuator element shaft 123 to an uppermost position in the orientation of the figures. The actuator element shaft 123 can then be depressed to first and second "on" positions and to provide first and second operating speeds.

In use an individual first selects one of the baskets 22 or 23. Generally the selection will be the large basket 22. If the articles are readily bruised, like berries, the small basket 23 may be preferable. As previously indicated, it may be preferable either to rinse the fruits, vegetables or other foods under a faucet or the like or to soak the food in the salad spinner 20. If rinsing under a faucet is preferred, the drain assembly 30 is opened and the foods are placed in the selected basket after rinsing. If soaking is preferred, the drain assembly 30 is closed; and the food is placed in the selected basket in the bowl 21. Then the individual fills the bowl 21 with water to some desired level. This can occur with cover 24 removed from the bowl 21 or through the funnel 25 with the cover 24 in place on the bowl 21. When the soaking is complete, the individual opens the drain assembly 30 to remove the water from the bowl 21.

With the cover 24 in place, the drying operation commences when the individual uses one hand to depress the actuator element 122 to the first "on" position. As previously indicated, there is no need for the individual to use a second hand to study the salad spinner 20 on a support surface. Initially, the spinning action begins at a reduced speed. If that speed is sufficient, the individual maintains relatively constant pressure on the actuator element 122 and the selected one of the baskets 22 or 23 spins at a constant lower speed. If a higher speed is desired, the individual applies a greater force to the actuator element 122 to move it to the second "on" position whereupon the selected one of the baskets 22 or 23 spins at a constant maximum speed. When the drying operation completes, the individual releases the actuator element 122 and the spinning action terminates.

As will now be apparent, a salad spinner constructed in accordance with this invention meets the various objects of this invention. The use of the anti-skid ring about the bowl bottom and the vertically displaced actuator for a battery operated drive motor provides a salad spinner that can be operated with one hand. All the elements are conventional low cost parts, so the manufacturing costs closely approximate the costs of conventional manually operated salad spinners. During operation, the spinning speed is constant. The use of the drain assembly 30 at the bottom of the bowl 21 and funnel 25 and the cover 24 provide the user with alternatives for washing or soaking food. The drive wheel 27 with its dual-drive capacity allows the spinner to accommodate differently sized baskets for improved flexibility and convenience with optimal storage configurations. Moreover, baskets of any size that are inserted can be operated at different constant spinning speeds that are optimized for the baskets of each size. Finally, the motor drive including the dc motor, switching assembly and actuator all provide a motor drive that is particularly adapted for use with salad spinners and other like devices.

This invention has been described in terms of one specific embodiment with certain specified variations. Still additional modifications will be apparent to those of ordinary skill in the art without departing from the invention. Therefore, it is the intent of the appended claims to cover all such variations and modifications as come within the true spirit and scope of this invention.

What is claimed as new and desired to be secured by Letters Patent of the United States is:

1. A salad spinner comprising:
   A) a bowl having an open top and a closed bottom with a central pivot,
   B) an open-top lattice first basket with a bottom portion carrying a central bearing for engaging said central pivot upon insertion into said bowl,
   C) a second basket for insertion into said bowl with a different size from said first bowl,
   D) a removable cover spanning said open top of said bowl and including an electric drive with a centrally disposed drive shaft emerging from said cover toward said bowl, and
   E) a drive wheel having a central hub engaging said drive shaft and first and second driving surfaces for engaging said first and second baskets, respectively, in a positive driving relationship whereby energizing said electric drive causes said drive wheel to spin a selected one of said baskets relative to said bowl.

2. A salad spinner as recited in claim 1 wherein said basket has a shape that conforms to the inside of the bowl and includes a bearing centered at the bottom of said basket for engaging said pivot.

3. A salad spinner as recited in claim 1 wherein said basket is substantially cylindrical in shape with a cross section that is less than the cross section of said bowl and includes a bearing centered at the bottom of said basket for engaging said pivot.

4. A salad spinner as recited in claim 3 wherein said basket additionally comprises a plurality of angularly spaced feet extending from the bottom thereof whereby at least one of said feet maintains said basket in a substantially upstanding orientation in said bowl when said cover and driving wheel are removed.

5. A salad spinner as recited in claim 1 wherein said electric drive includes an electric motor and an electric switch for selectively conveying electric power to said electric motor.

6. A salad spinner as recited in claim 5 wherein said electric motor comprises a dc motor and said electric drive additionally comprises a battery power supply in said cover.

7. A salad spinner as recited in claim 6 wherein said switch is characterized by an off position and first and second on positions and said electric drive additionally includes a resistor for being connected in series in the first on position whereby said electric motor has first and second operating speeds.

8. A salad spinner as recited in claim 6 wherein said battery power supply includes first and second terminals and wherein said switch includes:
   i) an actuator for being displaced along a switch axis from an off position to first and second on positions and including a conductive element attached to said first battery power supply terminal,
   ii) first and second switched contacts extending parallel to the switch axis to be engaged by said actuator conductive element at the first and second on positions respectively,
   iii) a resistor connecting said first contact to said second battery supply terminal and said second contact being connected directly to said second battery supply terminal,
   iv) first and second springs for defining said first and second on positions wherein when said actuator is moved to the first on position said conductive element engages said first terminal and when said actuator is moved to the second on position said conductive element engages said first and second terminals.

9. A salad spinner as recited in claim 5 wherein said cover includes a sealed receptacle for receiving said electric drive and switch and a sealed aperture for said drive shaft.

10. A salad spinner as recited in claim 5 wherein said bottom of said bowl includes a surface that defines a non-skid support plane and said electric switch displaces along an axis perpendicularly to said support plane.

11. A salad spinner as recited in claim 1 additionally comprising a drain in the bottom of said bowl thereby to discharge any water collected in said bowl.

12. A salad spinner as recited in claim 11 wherein said cover additionally comprises a passage therethrough for allowing water to be added to said bowl when said cover is in place on said bowl and wherein said bowl includes a drain valve in the bottom thereof having open and closed positions thereby to control the discharge of water from said bowl through said drain.

13. A salad spinner as recited in claim 11 wherein said basket includes angularly spaced longitudinal members and latitudinally spaced circumferential members that form a lattice through which water discharges during a spinning operation for collection in and drainage from the bottom of said bowl.

14. A salad spinner as recited in claim 13 wherein said bowl is transparent and the longitudinal position of at least one of said latitudinal members varies around the circumference thereby to provide an indication that the basket is turning.

15. A salad spinner as recited in claim 1 wherein said bottom of said bowl has a non-skid surface that forms a support plane and said electric drive includes a displaceable actuator that moves along a switch axis that is perpendicular to the support plane.

16. A salad spinner comprising:
A) a bowl having an open top and a closed bottom with a central pivot,
B) an open-top lattice basket with a bottom portion carrying a central bearing for engaging said central pivot upon insertion into said bowl,
C) a removable cover spanning said open top of said bowl and including an electric drive with a centrally disposed drive shaft emerging from said cover toward said bowl,
D) a drive wheel having a central hub engaging said drive shaft and a driving surface for engaging said basket in a positive driving relationship whereby energizing said electric drive causes said drive wheel to spin said basket relative to said bowl,
E) a centrally located drain in the bottom of said bowl thereby to discharge any water collected in said bowl.

17. A salad spinner for facilitating the washing of salad ingredients comprising:
A) a bowl having an open top and a closed bottom with a central pivot,
B) an open-top lattice basket with a bottom portion carrying a central bearing for engaging said central pivot upon insertion into said bowl,
C) a removable cover spanning said open top of said bowl and including an electric drive with a centrally disposed drive shaft emerging from said cover toward said bowl wherein said cover additionally comprises a passage therethrough for allowing water to be added to said bowl when said cover is in place on said bowl,
D) a drive wheel having a central hub engaging said drive shaft and a driving surface for engaging said basket in a positive driving relationship whereby energizing said electric drive causes said drive wheel to spin said basket relative to said bowl, and
E) a drain and drain valve in the bottom of said bowl thereby to control the discharge of water from said bowl through said drain.

18. A salad spinner as recited in claim 17 wherein said basket includes angularly spaced longitudinal members and latitudinally spaced circumferential members that form a lattice through which water discharges during a spinning operation for collection in and drainage from the bottom of said bowl.

19. A salad spinner as recited in claim 18 wherein said bowl is transparent and the longitudinal position of at least one of said latitudinal members varies around the circumference thereby to provide an indication that the basket is turning.

\* \* \* \* \*

UNITED STATES PATENT AND TRADEMARK OFFICE
CERTIFICATE OF CORRECTION

PATENT NO.     : 6,622,618 B1
DATED          : September 23, 2003
INVENTOR(S)    : Glucksman et al.

It is certified that error appears in the above-identified patent and that said Letters Patent is hereby corrected as shown below:

<u>Title page,</u>
Item [73], Assignee, delete Assignee name "Bojour, Inc." and insert
-- Bonjour, Inc. --.

Signed and Sealed this

Twenty-seventh Day of January, 2004

JON W. DUDAS
*Acting Director of the United States Patent and Trademark Office*